Figure 3:
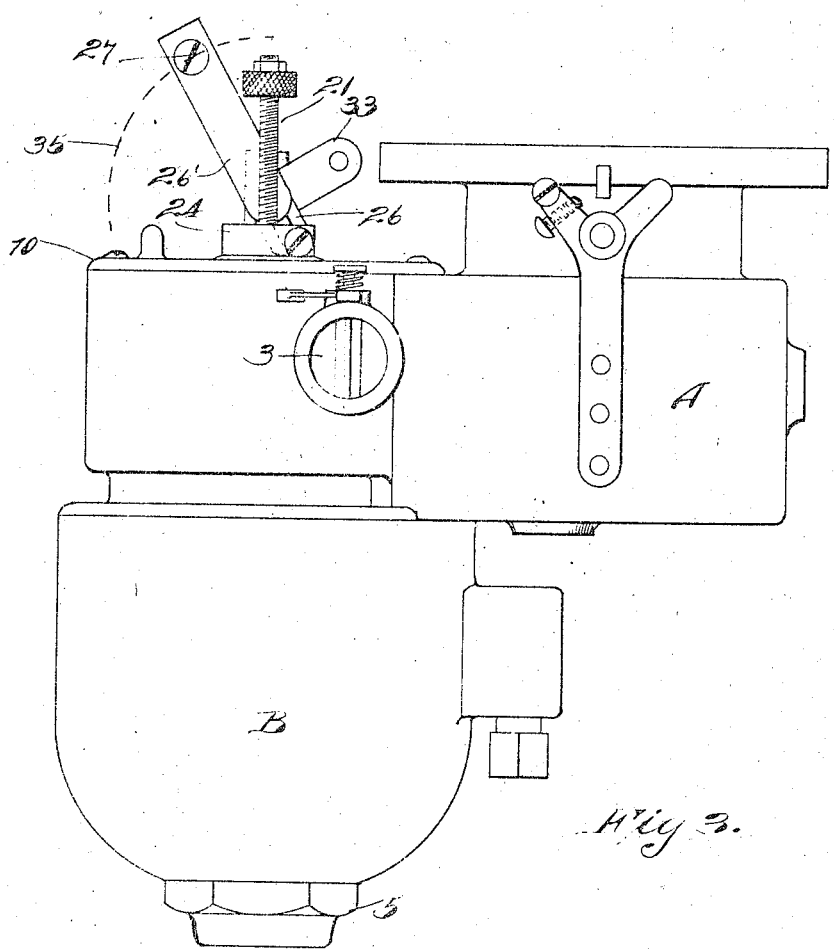

R. H. SMILIE.
CARBURETER.
APPLICATION FILED FEB. 12, 1912.
1,139,914.
Patented May 18, 1915.
2 SHEETS—SHEET 1.
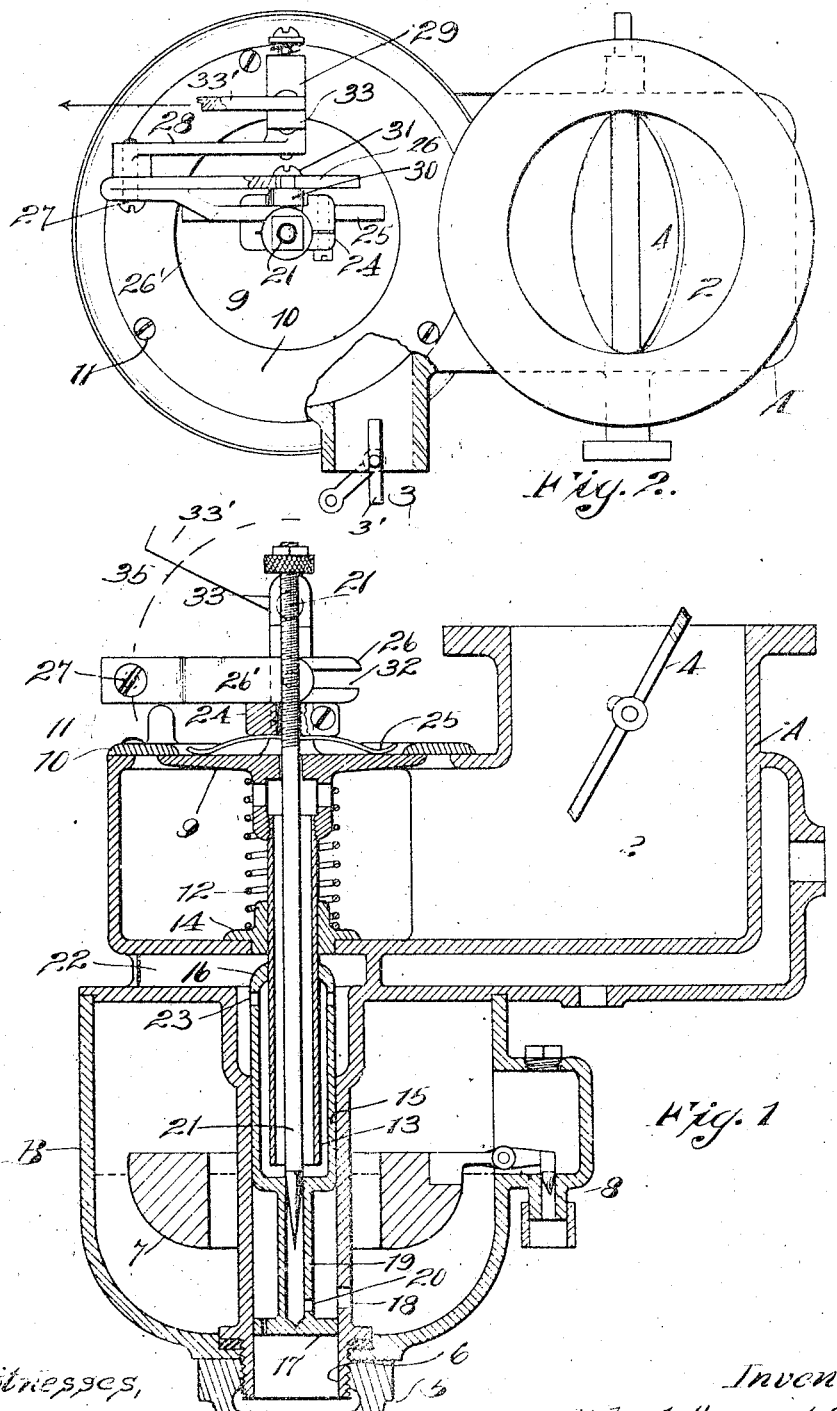

UNITED STATES PATENT OFFICE.

ROBERT H. SMILIE, OF BERKELEY, CALIFORNIA.

CARBURETER.

1,139,914.  Specification of Letters Patent.  Patented May 18, 1915.

Application filed February 12, 1912. Serial No. 677,198.

*To all whom it may concern:*

Be it known that I, ROBERT HOWARD SMILIE, citizen of the United States, residing at Berkeley, in the county of Alameda and State of California, have invented new and useful Improvements in Carbureters, of which the following is a specification.

This invention relates to carbureters and particularly to a carbureter for use in automobiles and where it is highly desirable to have a correct mixture under all conditions of speed, load and throttling.

In connection with this invention attention is directed to the important principles of carburization:—

1. *Influence of velocity of air passing into the mixing chamber upon the flow of fuel through the needle or fuel valve.*—In order that a homogeneous mixture of fuel and air may result from the suction caused by the increased velocity of air passing through an orifice, an added proportion of fuel must be assured above that passing a set opening of needle or fuel valve. It must be remembered that the velocity of air is mainly dependent upon three determining influences, namely, the throttle, the speed of the engine (this speed being influenced by the load for any particular case) and the resistance imposed by the air valve.

2. *Influence of the relative height of fuel level in float chamber upon flow of fuel through the needle valve.*—A very slight increase in the height of needle valve above fuel level will cause a relatively much greater suction to become necessary to draw the correct proportion of fuel. (As demonstrated by the fact that an automobile racing driver raises the float level until gasolene almost overflows from the needle valve and slackens the spring on the air valve, thus reducing the vacuum necessary to draw gasolene at high speed, with a consequent gain in power, but irregular running at low speed owing to an excess of gasolene.)

3. *Influence of changing speed of engine, and load upon same, upon velocity of air entering carbureter in regard to the proper opening of needle valve and flow of fuel.*—It is apparent that an engine running under a load resistance which is in direct proportion to the speed of the engine, will draw air and fuel in proportion to the throttle opening, in which case the added proportion of fuel necessary for a correct mixture, may be maintained by connecting the needle valve to the throttle in such a way that it opens in proportion as the throttle opens. However, it is evident that in automobile and many other classes of service, the load resistance bears no fixed relation to the speed of the engine or the throttle opening, obviating any possibility of correct control of the needle valve by the interconnection of needle valve and throttle. This also holds true in regard to the interconnection of the air valve and throttle. Thus it will be seen that the flow of air passing into the mixing chamber and cylinders is dependent upon several factors having no fixed relation to one another. Consequently, the throttle cannot be used to control the flow of fuel which must be in proportion to the flow of air to the cylinders. There is one factor however, *i. e.* the air valve opening of the carbureter which is in proportion to the flow of air and according to the right principles of carburization the fuel valve opening must vary in direct proportion to the flow of air.

The purpose of the present invention has been to design a carbureter on scientific principles in which the fuel valve opening is adapted to vary in direct proportion to the flow of air or movement of the air valve, the opening of which latter is in direct proportion to the flow of air; and to devise means whereby for any particular case this variation of the fuel valve is readily adjustable to meet varying conditions of temperature, altitude, gravity of fuel, etc.; all without interference with the mixing chamber and throttle, which latter must perform its function without consideration of any other factor.

The invention consists of the parts and the construction and combination of parts as hereinafter more fully described and claimed, having reference to the accompanying drawings, in which—

Figure 1 is a vertical section of the invention. Fig. 2 is a plan of the same. Fig. 3 is a side elevation of the invention.

A is a water-jacketed casing inclosing a mixing chamber 2 and having initial air inlet 3.

4 is a throttle controlling the flow of the explosive mixture (which is here supposed to be proper proportions of air and gasolene) to the cylinders.

B is a float chamber clamped to the underside of the mixing chamber casing A by means of a nut 5 screwing on to the dependent tubular projection or column 6 cast or otherwise formed on the underside of casing A.

7 is a float disposed in the float chamber, in which latter gasolene or other suitable fuel is admitted as at 8.

9 is the air inlet valve seating upwardly against the removable annular seat 10, which is adapted to be removably held in place on the casing A by the screws 11. Valve 9 is normally seated by the helical spring 12. Air valve 9 is screwed or otherwise suitably secured to the tube 13 which slides in a bearing 14 in casing A and carries a sleeve 15; the sleeve 15 being secured to the tube 13 at 16 and having a sliding fit in the column 6. The sleeve 15 has a piston 17 operating as a dash-pot in the lower end of the column 6 below the fuel inlet 18 and serving to prevent chattering, or vibration in the mechanism. Above the piston portion 17 the sleeve 15 is reduced as shown at 19; this reduced portion being hollow and perforated as shown at 20 to admit the gasolene into the interior of the sleeve and when needle valve 21 is opened to be drawn upwardly through the sleeve and tube 13 into the mixing chamber 2. At the same time some air is drawn in through the auxiliary screened air space 22 and ports 23 and through the space between the enlarged part of the sleeve 15 and tube 13 and around the lower end of the latter.

The needle valve 21 seats in the lower contracted end of the sleeve 15 and has a sliding fit through the top of the valve 9 and is adjustably secured in a block 24, which is yieldably supported on valve 9 by spring 25.

26 is a slotted lever fulcrumed at one end at 27 on the arm 28 which latter is fulcrumed at 29 on a lug on the air valve seat 10.

30 is an upwardly projecting lug on valve 9, which carries a pin 31 embraced by the forks forming the slot 32 in the lever 26. The pivot 29 and pin 31 are in axial line and both are shown as disposed in the plane of the needle valve 21. Lever 26 has an offset arm 26' bearing on the spring supported block 24. The upper portion of the needle valve is threaded so as to be adjustable in the block 24.

33 is a crank formed on arm 28; the design being in practice to connect this arm 33 by means of a link 33' with a lever in convenient reach of the operator whereby the arm 28 can be rocked on its pivot and therefore shift the fulcrum 27 of the lever 26, for the purpose shortly to be described.

Assuming the parts to be in the position of Fig. 1 with slotted lever 26 horizontal, the operation is as follows: The needle valve 21 which screws through the block 24 is turned until the correct fuel opening for low speed is obtained for the air, which enters through ports 23 and sleeve 15 and tube 13, and also passage 3, said passage having a shutter 3' by which said passage may be closed more or less allowing an increased suction to give a richer mixture for use in starting; this adjustment of the needle valve being designed to give a correct amount of fuel to mix with the initial air, with the engine running at lowest speed and before the air valve 9 begins to open. As the engine speeds up and increases the suction the air valve 9 opens, causing tube 13 and sleeve 15 to move downward in unison with it. At the same time the screw or pin 31 on lug 30 acts to carry the lever 26' downward; and as the lever 26' bears upon the block 24, and as the needle valve is firmly locked in block 24, the needle valve is also carried down in unison with the air valve 9 thus not changing the needle valve opening. However, it is desirable to increase the opening of the fuel valve in proportion as the air valve opens for the higher speeds, but this variation of the fuel valve opening must bear a direct proportion of the air valve opening, which proportion is capable of variation at will. Therefore, as a greater proportion of fuel to air is needed the lever 26 is tilted by rocking crank 33 and arm 28; the arc 35 representing the locus of the pin 27. As the lever 26 is swung upward from a horizontal position the downward movement of the needle valve 21 is gradually shortened by reason of the disposition of the parts and the action of the pin 31 in slot 32. For instance, if arm 28 and lever 26 were swung to a vertical position, the pin 31 on the air valve lug would not change the position of the lever 26 at all, as the pin would travel vertically in the vertically located slot 32, with the consequence that the needle valve would stand still but its seat in sleeve 15 would be continually moving away from it, as the air valve opens.

Thus it will be seen that when the lever 26 is horizontal the fuel valve opening remains constant, irrespective of the amount of opening of the air valve 9, or the amount of air drawn into the mixing chamber; and that as the lever 26 is swung upward the needle valve travels downward at a proportionately slower rate than the air valve, which latter carries the seat of the needle valve, thus increasing the needle valve opening to any proportion desired, according to this adjustment. The more the lever 26 is tilted from the horizontal the more the needle valve 21 lags behind its seat as the valve 9 opens.

By means of the lever, or swinging fulcrum adjustment, I am able to vary the proportions of fuel and air without changing the low speed initial adjustment and therefore can run the engine at moderately high speed under load, and make this adjustment, thus insuring a correct mixture under all conditions of speed, load and throttling.

By this arrangement the valve spring 12 may be made comparatively light, thereby reducing the vacuum; the use of this light spring being possible by reason of the increasing fuel valve opening, and drop of needle valve below gasolene level.

The invention permits of the adjustment of the fuel inlet with respect to the air inlet when the engine is running and without opening up the hood where the device is used in an automobile. This is often a great advantage.

The two adjustments, to-wit: the initial adjustment of the needle valve 21 in block 24, and of the lever 26, amply take care of any variation necessary, leaving the device so simple in regard to adjustment that an entirely inexperienced person can adjust it perfectly.

Another advantage of this device is the use of the plunger or dash-pot 17 at the lower end of the column 6 to prevent chattering or vibration of the mechanism.

It is manifest or possible that the construction herein specified may be varied without departing from the principle of the invention, and I desire it to be understood that the invention is not limited to any specific form or arrangement of parts, except in so far as such limitations or their mechanical equivalents are specified in the claims.

Having thus described my invention what I claim and desire to secure by Letters Patent is—

1. In a carbureter, the combination of a casing having an air inlet and a fuel inlet, with corresponding air and fuel valves, of a lever which is slotted at one end, a pin carried by the air valve fitting the slot, said lever having a fulcrum adjustable in an arc which is concentric with said pin in the closed position of the air valve, and means connected with the fuel inlet valve whereby the opening of the latter is made to vary with respect to the opening of the air valve accordingly as the fulcrum of said lever is moved.

2. In a carbureter, the combination with a casing having an air inlet and a fuel inlet, with corresponding air and fuel valves, of a lever which has a sliding connection with the air valve, the lever having one end fulcrumed on a swinging arm, and connections between the lever and fuel valve whereby as the arm is swung in one direction the fuel valve opens more for a given opening of the air valve than for the same opening of the air valve in another position of the lever, and vice versa when the lever swings in the opposite direction it opens proportionally less.

3. In a carbureter, the combination of a mixing chamber, an air valve, a fuel valve, a lever having a fulcrum at one end movable in an arc, means for varying the position of said fulcrum in said arc, the opposite end of the lever having a connection with the air valve and said lever forming an abutment to limit the opening movement of the fuel valve whereby the air valve operates through the lever to control the fuel valve.

4. In a carbureter, the combination of a mixing chamber, an air inlet valve and a fuel inlet valve, a lever having a movable fulcrum at one end, the locus of said fulcrum being an arc, the opposite end of the lever having a connection with the air valve, and means whereby the air valve operating through the lever controls the fuel valve.

5. In a carbureter, the combination of a mixing chamber, an air inlet valve, a fuel inlet valve and a lever which connects with and controls the fuel inlet valve and whose position is arcuately adjustable about a means provided for said lever's operation by the air valve.

6. In a carbureter, the combination of a mixing chamber, an air inlet valve, a fuel inlet valve, a lever connecting both valves, said lever fulcrumed on an arm which is mounted for arcuate movement so as to change the position of the fulcrum of said lever, means to effect a low-speed initial adjustment, and a high-speed adjustment including means by which said lever is operated upon by one of said valves to cause the other valve to have a proportional opening and closing movement in unison therewith.

7. In a carbureter, the combination of an air inlet valve and a fuel inlet valve, having respective seats, means by which the fuel valve-seat moves in unison with the air inlet valve, and means by which the fuel valve is made to lag behind its seat when the air inlet valve opens.

8. The combination in a carbureter having an air inlet and a fuel inlet, of a valve for the air inlet and a needle valve for the fuel inlet, a valve-seat for the fuel inlet valve carried by the air inlet valve, and means by which the needle valve-seat moves away from the needle valve as the air inlet valve opens.

9. In a carbureter, the combination of a casing having a mixing chamber, the outlet of which is throttle controlled, said mixing chamber provided with an air inlet valve and a fuel inlet valve, said air inlet valve carrying the seat for the fuel inlet valve, and means for adjustably supporting the fuel valve whereby the relative movement on its seat with respect to the fuel valve, may be varied correspondingly with the desired variations in the proportion of air and fuel.

10. In a carbureter, the combination of a mixing chamber having an air inlet and a fuel inlet, an air valve, the fuel inlet provided by a sleeve member carried by the air valve, said sleeve member operating in a cylinder and having a portion co-acting with the cylinder as a dash-pot, a fuel valve carried by the air valve, and means for adjustably supporting said fuel valve with respect to its seat whereby the proportion of the opening of the fuel valve to the air valve may be varied while the engine is running.

11. In a carbureter, the combination of a casing having a mixing chamber, said mixing chamber provided with an air inlet valve and a fuel inlet valve, a block yieldably supported on the air valve, said fuel valve adjustably supported on the block and having a seat carried by the air valve, a forked lever bearing on the block and having a movable fulcrum, the forked end of the lever pivoting on the air valve, said fulcrum for the lever adjustable in an arc concentric with said pivot.

12. In a carbureter, the combination of a casing having a mixing chamber provided with an air inlet valve and a needle fuel valve, a seat for the needle fuel valve carried by the air inlet valve, a block yieldably supported on the air inlet valve and in which block the needle valve is adjustable, a forked lever bearing on the block, said air inlet valve having a pin straddled by the forks of the lever, an arm pivoted in the line of the axis of the pin and independent of the air valve, said lever fulcruming on said arm.

13. In a carbureter, the combination of a mixing chamber having an air inlet valve, a liquid fuel containing chamber below and in communication with said mixing chamber, a needle valve controlling the passage of the fuel to the mixing chamber, a seat for the needle valve carried by the air valve, said needle valve and seat below the fuel level in the fuel chamber, and a device connected with the air valve and operative on the needle valve to regulate the opening of the needle valve proportionally with the air valve.

14. The combination in a carbureter, of two valves, a lever connected at one end to one of said valves and the other end having a fulcrum which is adjustable in an arc, said lever also operatively connected with the other valve whereby the proportional opening of the two valves with respect to one another is variable at the will of the operator.

15. In a carbureter, the combination of a mixing chamber, an air valve and a fuel valve, means for effecting a low-speed initial adjustment for the fuel valve and air valve, and a high-speed adjustment including a lever fulcrumed on an arm which is mounted for arcuate movement and which lever is connected with both valves for varying the relative movement of the fuel and air valves without changing the low-speed initial adjustment.

In testimony whereof I have hereunto set my hand in the presence of two subscribing witnesses.

ROBERT H. SMILIE.

Witnesses:
CHARLES EDELMAN,
J. M. KNUDSEN.